United States Patent [19]
Floch et al.

[11] Patent Number: 5,623,375
[45] Date of Patent: Apr. 22, 1997

[54] INTERNATIONAL DIELECTRIC MIRROR AND PRODUCTION PROCESS FOR SUCH A MIRROR

[75] Inventors: Hervé Floch, Brunoy; Michel Berger, Seyssinet, both of France

[73] Assignee: Commissariat A L'energie Atomique, Paris, France

[21] Appl. No.: 211,750

[22] PCT Filed: Oct. 13, 1992

[86] PCT No.: PCT/FR92/00962
§ 371 Date: Aug. 8, 1994
§ 102(e) Date: Aug. 8, 1994

[87] PCT Pub. No.: WO93/08490
PCT Pub. Date: Apr. 29, 1993

[30] Foreign Application Priority Data

Oct. 15, 1991 [FR] France .................... 91 12685

[51] Int. Cl.⁶ ................ G02B 27/00; G02B 7/182; G02B 5/08; C08G 77/04
[52] U.S. Cl. .............. 359/883; 359/871; 359/872; 359/900; 428/213; 428/912.2; 428/148
[58] Field of Search ...................... 359/883, 871, 359/872, 900, 580; 156/233, 239; 264/331.11; 428/213, 912.2

[56] References Cited

U.S. PATENT DOCUMENTS

| 2,432,484 | 12/1947 | Moulton | 359/580 |
|---|---|---|---|
| 3,976,890 | 8/1976 | Barner, Jr. et al. | 359/883 |
| 4,157,235 | 6/1979 | Ungar et al. | 428/148 |
| 4,357,395 | 11/1982 | Lifshin et al. | 156/233 |
| 4,414,316 | 11/1983 | Conley | 428/163 |
| 4,451,119 | 5/1984 | Meyers et al. | 359/883 |
| 4,576,850 | 3/1986 | Martens | 428/156 |
| 4,814,232 | 3/1989 | Bluege et al. | 359/900 |
| 4,997,674 | 3/1991 | Parr et al. | 427/123 |
| 5,149,578 | 9/1992 | Wheatley et al. | 428/213 |
| 5,183,597 | 2/1993 | Lu | 264/1.4 |

FOREIGN PATENT DOCUMENTS

| 2549968 | 2/1985 | France . | |
|---|---|---|---|
| 0110101 | 5/1986 | Japan | 428/912.2 |
| 0074005 | 4/1988 | Japan | 428/912.2 |
| 404335301 | 11/1992 | Japan | 428/912.2 |

OTHER PUBLICATIONS

Ceramic Bulletin, vol. 69, No. 7, 1990, pp. 1141–1143: H. G. Flock and J. Priotton Colloidal Sol–Gel Optical Coatings'.
Week 8549 Derwent Pub. Ltd. London, GB; AN 85–307423 & JP, A, 60, 214 302 (Suwa Seikosha KK) 20 Octobre 1985.

*Primary Examiner*—Paul W. Dzierzynski
*Assistant Examiner*—Mohammad Y. Sikder
*Attorney, Agent, or Firm*—Cesari and McKenna

[57] ABSTRACT

The present invention relates to an interferential or interference dielectric mirror and to its production process. The mirror includes a ground, planar substrate, whose surface has been replicated with a thermal plastic resin, the substrate being covered with at least one layer of colloids having a low refractive index and at least one layer of colloids having a high refractive index, the two layer types being arranged in an alternating manner. The mirror is both inexpensive and resistant to laser flux.

17 Claims, 2 Drawing Sheets

INTERNATIONAL DIELECTRIC MIRROR AND PRODUCTION PROCESS FOR SUCH A MIRROR

The present invention relates to an interferential, or interference dielectric mirror, as well as to its production process.

BACKGROUND OF THE INVENTION

Interferential dielectric mirrors comprise a substrate covered by a dielectric film which reflects one or more desired wavelengths, while having a relatively low intrinsic absorption compared with the conventionally used metals.

Preferably, the invention relates to monochroic or polychroic, passive, dielectric mirrors reflecting wavelengths from the near ultraviolet to the near infrared.

Interferential dielectric mirrors can more specifically be used in high power laser systems, in photovoltaic and thermal applications, solar applications or in integrated optical systems.

A certain number of processes are already known making it possible to produce transparent, dielectric films and to deposit them on non-metallic substrates.

German patents 736 411 and 937 913 refer to the use of hydrolyzable compounds for the preparation of various interference films. The major disadvantage of these processes is the indispensable heat treatment at between 500° and 600° C. in order to convert the polymeric intermediates into the final, dense ceramics. These high temperatures limit the choice of the nature of the substrate to be coated.

U.S. Pat. No. 2,584,905 deals with the preparation of thin, reflecting films from alcoholic $TiCl_4$ solutions and a silicon alkoxide. Once again, it is necessary to have a heat treatment stage making it possible to appropriately densify the oxides. In this process, the problems of glazing and scaling linked with the densification of the materials, considerably reduce the production of high reflection, multilayer structures.

U.S. Pat. No. 3,460,956 describes the preparation of reflecting $TiO_2$ films from hydrolyzates of tetraalkyl titanates in an alcoholic medium. Once again, for effectively converting the polymeric film into a dense oxide, said film must undergo heating at around 500° C., which is therefore prejudicial for any organic substrate.

U.S. Pat. Nos. 2,768,909 and 2,710,267 describe the production of reflecting $TiO_2$ films from alcoholic sols of a titanium alkoxide, said sols being hydrolyzable by atmospheric moisture. This approach also requires a high baking of the condensed intermediates.

U.S. Pat. No. 4,272,588 relates to the possibility of increasing the reflectivity of precious metal mirrors, as well as the possibility of making the same chemically passive by the deposition of $TiO_2$ and $Ta_2O_5$ dielectric coatings obtained from molecular precursors. Such layers are obtained by an obligatory heating at approximately 400° C.

The use of submicroscopic, colloidal particles for the preparation of microporous, optical films dates back about forty years and was in particular described in U.S. Pat. No. 2,432,484. The latter document describes the use of $SiO_2$, colloids synthesized from a silicon alkoxide in solution, and/or a sodium silicate, in order to obtain antireflection films. Roughly 35 years later, another U.S. Pat. No. 4,271,210 describes the use of the colloidal procedure for producing thin optical films. The process described in said patent consists of synthesizing and depositing microgranular films of hydrated alumina as an antireflection coating on a vitreous substrate. This process involves heat treatment at between 300° and 500° C. in order to obtain the metal oxide, which limits the substrates which can be used.

Moreover, processes for the deposition of colloidal layers are known. Thus, an article entitled "Colloidal Sol-Gel Optical Coatings" published in "The American Ceramic Society Bulletin", vol. 69, no. 7, pp. 1141 to 1143, 1990, describes the possibility of depositing several layers of colloidal materials by centrifugal coating, in order to produce the optical components of a laser. This article states that by using sol-gel colloidal suspensions and by appropriately choosing volatile solvents for forming the liquid phase of the colloidal medium, it is possible to carry out treatments at ambient temperature without excessive heating of the substrate. Therefore this procedure makes it possible to treat thermally fragile materials.

Moreover, in the field of replicating optical surfaces, the preparation of metal mirrors goes back more than 40 years. U.S. Pat. No. 2,444,533 relates to a surface copying process by molding—demolding in order to obtain concave substrates of optical quality.

French patent 2 061 847 relates to the chemical replication of optical surfaces for the production of planar metal mirrors.

French patents 2 310 308 and 2 310 477 describe the production of replicated metal reflectors for electricity generating devices by concentrating solar energy.

Finally, a surface replication method with epoxy resins and using a metallic mould release or demoulding agent is described in the article by Assus (J. of Optics, vol. 20, no. 5. pp. 219–223, 1989), while a moulding process with a resin polymerizing under the action of ultraviolet rays and a chemical demolding agent is described in the article by Mahé and Marioge (J. of Optics, vol. 19, no. 2, pp. 83–91, 1988).

Most of the methods relating to the reflecting treatment of surfaces referred to hereinbefore suffer from the disadvantage of requiring heating at high temperatures and therefore limiting the substrates to which this treatment type can be applied. Moreover, none of the prior art methods makes it possible by a process in solution, to produce dielectric mirrors simultaneously having a good resistance to the laser flux, a large surface and low manufacturing costs. Moreover, no process is known which makes it possible to produce dielectric mirrors replicated in large numbers, with relatively unsophisticated equipment and with low production costs.

SUMMARY OF THE INVENTION

The object of the invention is to produce dielectric mirrors meeting the above requirements.

To this end, the invention relates to a dielectric mirror comprising a ground, planar substrate, whose surface has been replicated with a thermoplastic resin, said substrate being covered with at least one first layer of colloids and at least one second layer of colloids, the first layer having a refractive index below that of the second layer, said two layer types being arranged in alternating manner.

The thus obtained mirrors simultaneously have good optical qualities obtained by the replication of optical surfaces, as well as a good resistance to the laser flux and a durable reflectivity. The colloidal media having a high or low refractive index are generally stable for several months or even several years. Once deposited and dried, a colloidal layer does not again pass into suspension even if it is again impregnated by a treating solution.

Preferably, the colloids of the first layer are chosen from among calcium fluoride or magnesium fluoride or better still silicon oxide.

In the same way, preferably, the colloids of the second layer are chosen from among oxides of titanium, zirconium, hafnium, thorium, tantalum, niobium, yttrium, scandium or lanthanum or better still from among aluminas.

However, it should be noted that the precursors necessary for preparing the colloidal suspensions of yttrium, scandium or lanthanum oxides are expensive and would be less frequently used for these reasons.

The use of these specific oxides makes it possible to obtain thick deposits by multiple alternate, consecutive applications, while obtaining mirrors free from cracks and/or internal cleavage planes, even for a total sol-gel layer thickness close to 8 microns. Moreover, it is possible to obtain a large number of combinations of alternating layers.

Advantageously, the thickness of the two types of layers varies between 50 and 250 nm as a function of the refractive index of the material and the wavelength of the work involved. The two types of layers have different thicknesses in order to produce mirrors able to operate at normal or oblique incidences, at a desired wavelength $\lambda$.

In the invention, the diameter of the colloids is in a range between approximately 5 and 40 nm, which permits optical applications from the near ultraviolet to the near infrared with reduced specular diffusions.

According to an advantageous feature of the invention the substrate is replicated with a thermoplastic resin chosen from among the following resins: epoxy, bisphenol diglycidyl-ether, glycidyl-ester, glycidyl-amide, glycidyl-amine, silicone-glycidyl, thioglycidyl or fluoroglycidyl.

Finally, the two types of layers having different refractive indices can advantageously incorporate a nonionic surfactant chosen from among alkylphenoxy polyethoxy ethanols or polyglycol ethers. The use of these surfactants is remarkably effective for obtaining uniform films.

The invention also relates to a process for the production of said interferential or interference dielectric mirror.

According to the features of the invention, this process consists of:

coating a master substrate with a demolding agent, trapping a thermoplastic resin between the master substrate and a planar, ground substrate, polymerizing and crosslinking the said resin, separating the master substrate from the replicated substrate, preparing a first colloidal suspension, preparing a second colloidal suspension of colloids having a refractive index higher than that of the first suspension, depositing on the replicated substrate, at ambient temperature, alternately a layer of each colloidal suspension, drying each layer following its deposition.

The preparation of optical quality, planar surfaces using a replication method rather than a conventional polishing method permits a larger-scale and therefore less expensive production.

Moreover, the process according to the invention using the colloidal procedure has the characteristic of authorizing deposits directly at ambient temperature. This is virtually unique, because it opens doors to the treatment of thermally fragile substrates such as those made from plastics and the like. Thus, a replicated substrate is only a glass or other support, whose surface has been molded with a plastic film giving an excellent synergy and complementarity of the sol-gel with the replication method for the easy production on a large scale basis of mirrors.

According to features of the invention, the first colloidal suspension incorporates colloids chosen from among silicon oxide, calcium fluoride or magnesium fluoride and dispersed in a solvent.

The second colloidal suspension consists of colloids chosen from among oxides of aluminium, titanium, zirconium, hafnium, thorium, tantalum, niobium, yttrium, scandium or lanthanum and dispersed in a solvent.

Preferably, the solvent is chosen from among saturated, aliphatic alcohols of formula ROH, in which R stands for an alkyl with 1 to 4 carbon atoms. The use of alcoholic treating solutions permits an optional treatment of a hygroscopic substrate.

According to preferred features of the invention, the layer of colloids is deposited by centrifugal coating.

The centrifugal coating treatment process makes it possible to treat relatively large surfaces and therefore offering advantageous mass production possibilities. In addition, the centrifugal coating procedures require the use of only unsophisticated equipment and standard operating conditions. Therefore the cost of the final treatment is very advantageous compared with standard evaporation methods. The centrifugal coating procedures are approximately 5 to 10 times less expensive than conventional procedures.

Preferably, the mold release or demolding agent is chosen from among silicones, fluorinated polymers or sucroses.

The use of a chemical demolding agent in solution makes it possible to easily treat the master substrate by simply immersing it and is therefore very appropriate for a mass production of parts from the same master and is more cost effective than prior art procedures using a metallic demolding agent. Thus, when a metallic demolding agent is used, it is indispensable for there to be a vacuum evaporation operation for said metal before each replication. Therefore this procedure is more complicated. However, in certain special applications, it is possible to use metallic agents.

The thermoplastic resin permitting the replication of the substrate is chosen from among the aforementioned resins.

BRIEF DESCRIPTION OF THE DRAWINGS

The invention is described in greater detail hereinafter relative to a non-limitative embodiment and with reference to the attached drawings, wherein show.

DESCRIPTION OF THE PREFERRED EMBODIMENT

Figure 1:
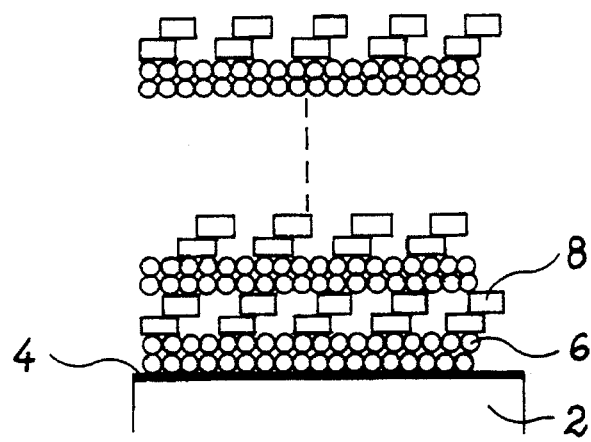
FIG. 1 a diagrammatic section of an embodiment of the dielectric mirror according to the invention.

As illustrated in FIG. 1, the dielectric mirror according to the invention comprises a planar, ground substrate 2, whose surface has been replicated with a suitable thermoplastic resin 4 using a process to be described hereinafter. This substrate 2 is covered with at least one first layer 6 of colloids and at least one second layer 8 of colloids having a refractive index higher than that of the first layer. The two layer types are arranged in alternating manner.

The substrate 2 according to the invention can be of an organic or inorganic nature and is more specifically siliceous, metallic or ceramic. Tests were carried out on inexpensive vitreous substrates of the borosilicate type sold under the registered trademarks BK-7, Pyrex, Zérodur and Duran 50.

Preferably, the colloids are chosen from among those referred to hereinbefore.

The process for the production of interferential or interference, dielectric mirrors according to the invention will now be described. This process involves a first series of stages consisting of replicating the substrate and a second series of stages consisting of depositing colloidal solutions having different refractive indices on the thus prepared substrate.

Figure 2:
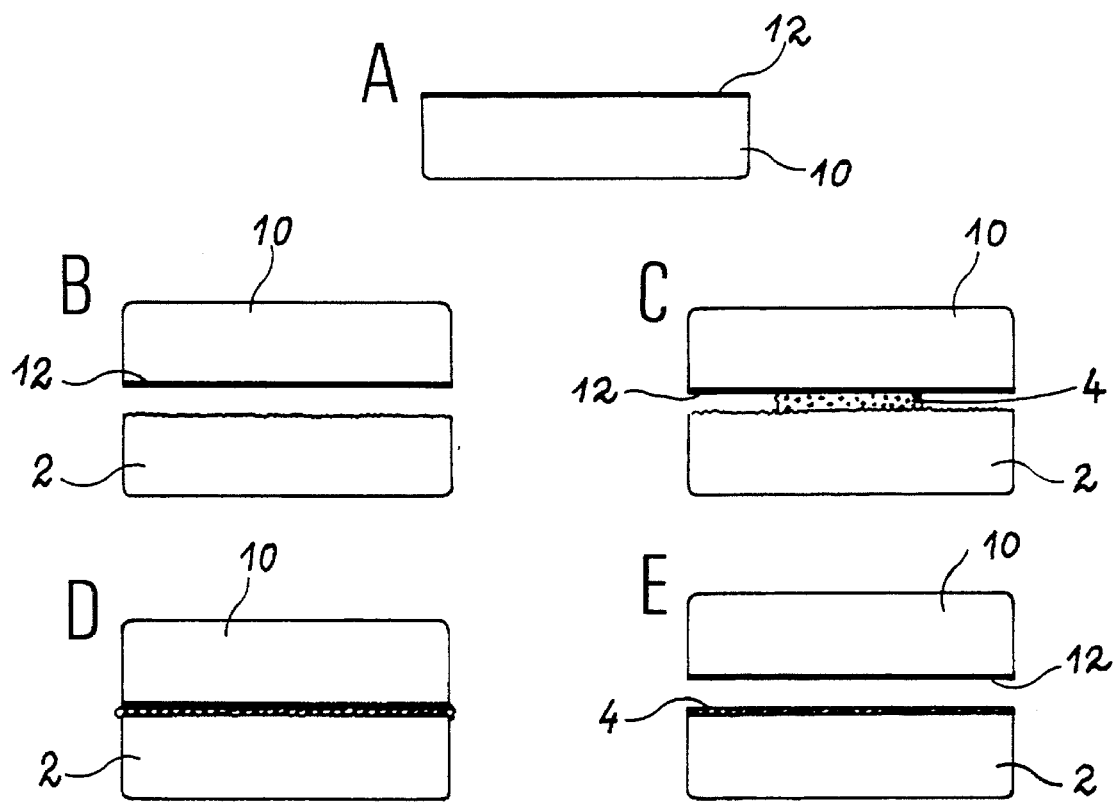
FIG. 2 diagrammatically the different stages of the substrate replication process.

FIG. 2 illustrates the first series of stages concerning the replication of the substrate. The replication of a substrate consists of reproducing as faithfully as possible in smoothness and roughness the surface of a reference part normally known as a master substrate and designated 10 in FIG. 2. This master substrate 10 is generally made from silica, borosilicate or glass-ceramic (e.g. that covered by the registered trademark Zérodur). The replication of the surface takes place by the use of a malleable material placed on a mediocre substrate (reference 2). Thus, by means of a moldable intermediary, transfer takes place to a surface having approximate characteristics new quality characteristics.

The first stage, corresponding to part A of FIG. 2, consists of preparing the standard surface of the master substrate 10 by depositing there a mold release or demolding agent 12 indispensable for the subsequent separation of the master substrate 10 and the replicated substrate 2. The methods used for performing this replication are known and are described in the prior art documents cited hereinbefore. It is thus possible to use as the demolding agent 12, a metallic film usually made from silver or gold, as described in the Assus method quoted hereinbefore or use a chemical agent such as a silicone, a fluorinated polymer or certain sucroses in accordance with the Mahé-Marioge method quoted hereinbefore. As has already been explained, this second method is more appropriate for the mass production of parts from the same master substrate to and preference is therefore given in the present invention to the use of a chemical demolding agent.

The following stage, corresponding to part B of FIG. 2, consists of placing in front of the master substrate 10 covered with the demolding agent coating 12, the substrate 2 to be replicated.

A third stage, shown in part C of FIG. 2, consists of trapping between the master substrate 10 and the ground substrate 2 to be replicated, the pasty resin 4 which is sufficiently fluid for faithfully molding the standard surface of the master substrate 10.

The resins used are those mentioned hereinbefore. However, among these preference is given to the use of epoxy resins of the cycloaliphatic glycidyl-ether type or resins of the bisphenol diglycidyl-ether type.

The third stage of the process described in part D of FIG. 2 consists, after injecting between the two parts 10 and 2 the precise quantity of resin 4 which is necessary, carrying out an isostatic and thermal pressing operation under good cleanness conditions (minimum 10,000 class room, U.S. standard). During this stage, the radical polymerization and crosslinking of the resin commence. This polymerization and crosslinking phase lasts between 24 and 48 hours, as a function of the resin type chosen.

The hardeners used for polymerizing these resins are in particular cyclic, carboxylic arthydrides or acids or Lewis bases.

Finally, the fifth stage of the process represented in part E of FIG. 2, consists of mechanically separating the master substrate 10 from the replicated substrate 2. The resin 4 corresponding to the impression of the master substrate 10 is then on the replicated substrate 2 in the form of a layer with a thickness of 20 to 100 μm. For example, with the method using a chemical demolding agent, it is possible to replicate 20 to 30 parts using a single master substrate. In the same way, it is also possible to replicate planar surfaces which are not circular.

This is followed by the preparation of the colloidal solutions forming the coating layers of the replicated substrate 2.

The colloidal suspensions or sols are heterogeneous media constituted by a liquid phase (the solvent) and a solid phase (the colloids forming the deposit). A simple evaporation of the solvent is then sufficient to create the final microparticular film. The colloids left on the surface of the substrate then form a porous film, whose refractive index is well below that of the dense film. The colloids used are those referred to hereinbefore.

The colloidal suspensions prepared in the invention are obtained from ionic precursors (acid salts) purified by recrystallization or molecular precursors (alkoxides) purified by distillation. Preferably these sols are respectively produced according to the methods of Stober (J. Colloid Interface Sci., 26, pp. 62–69, 1968) for $SiO_2$, Thomas (Appli. Opt. 26, 4688, 1987) for $TiO_2$, Clearfield (Inorg. Chem., 3, 146, 1964) for $ZrO_2$ and $HfO_2$, O'Connor (U.S. Pat. No. 3,256,204, 1966) for $ThO_2$, Yoldas (Am. Cer. Soc. Bull., 54, 289) for AlOOH, S. Parraud (MRS, Better Ceramics Through Chemistry, 1991) for $Ta_2O_5$ and $Nb_2O_5$ and finally Thomas (Appl. Opt., 27, 3356, 1988) for $CaF_2$ and $MgF_2$.

The ionic precursors are usually chosen from among chlorides, oxychlorides, perchlorates, nitrates, oxynitrates or acetates.

The molecular precursors are preferably chosen from among alkoxides of molecular formula $M(OR)_n$ (M representing a metal, OR an alkoxy radical with 1 to 6 carbon atoms and n the valency of the metal). In the methods described hereinbefore, the precursor is hydrolyzed or fluorinated and is then polymerized until an end product is obtained, which is insoluble in the chosen solvent, nucleated and referred to as a colloidal suspension. In the case of alkoxides, the hydrolysis must be strictly controlled in view of the tact that these organometallic derivatives are highly hydrophilic.

According to the invention, preference is given to the use of solvents having a saturated aliphatic nature ROH with an alkyl group R having 1 to 4 carbon atoms. It is also possible to use alcohols with a larger number of carbon atoms, but this leads to thicker films.

Preferably, these colloidal suspensions contain a concentration of solids (colloids) varying between 1 and 10% by weight of the total solution. They have viscosities between 2 and 5 centipoises (2 and 5 mPa•s) and surface tensions between 25 and 35 dynes•$cm^{-1}$ (25 to 35 mN/m).

It should also be noted that each colloidal suspension must be carefully filtered prior to use using a glass fiber or Teflon (registered trademark, manufactured by E.I. du Pont de Nemours & Co, Wilmington, Del.) membrane, as a function of the particular case.

The solutions obtained have an opalescent or translucent appearance, which is a characteristic of the colloidal nature of the dispersed phase.

Figure 3:
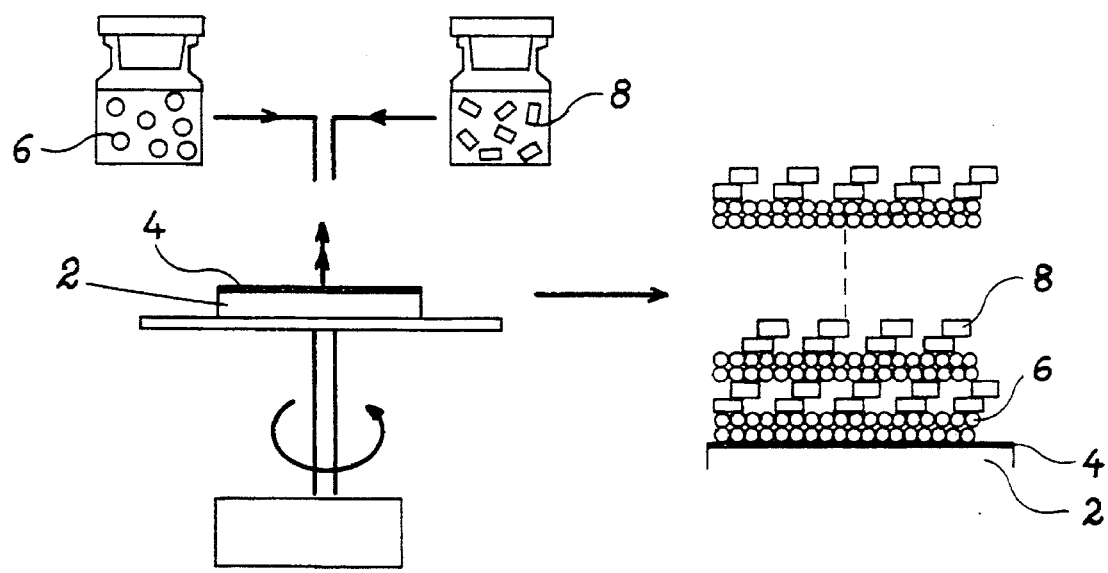
FIG. 3 diagrammatically the different stages of the substrate reflecting treatment process according to the invention.

The prepared and filtered, colloidal suspensions are deposited on the surface of the replicated substrate 2 covered by its resin layer 4 by using a centrifugal spreading method (cf. FIG. 3). The deposits could also be made by impregnation or by spraying. However, in the invention, preference is given to centrifugal spreading because said deposition method makes it possible to treat relatively large surfaces with limited product costs. Typically, successive deposition takes place of the two types of colloidal suspensions on the substrate 2 rotating at a speed between 350 and 1000 r.p.m.

FIG. 3 shows in arbitrary manner as the first layer deposited on the substrate, the first layer 6 having the lower refractive index than that of the second layer 8, followed by an alternating succession of layers 8 and 6, but the opposite order could also be adopted.

Following the deposition of each layer 6, 8, there is a drying stage at a temperature between 40° and 60° C., preferably close to 60° C., e.g. under an infrared lamp for 5 to 20 minutes.

By varying the rotation speed or the solute concentration of the treating sols, the thickness of the coating is modified. Thus, if the rotation speed decreases and/or if the colloid concentration increases, the deposited film is thicker and vice versa.

As a function of the nature of the desired spectral response at a given incidence, the layers 6 and 8 would have an optical thickness $\lambda 4$ or not, $\lambda$ representing the wavelength of the incident wave.

The thicknesses of each layer having a high or low refractive index vary between 50 and 250 nm.

As a function of the refractive index difference between the two layer types 6, 8, there will be a varying number of alternating layers 6 and 8 in order to achieve the desired reflectivity. For example, in the system $TiO_2$-$SiO_2$ or $TiO_2$-$CaF_2$, the refractive index difference is approximately 0.75 between the layers 6 and 8 and about 15 layers in all are necessary in order to have a reflection close to 99%. However, in the $AlOOH$-$SiO_2$, system, the difference between the refractive indices is close to 0.22, so that it is then necessary to deposit 34 layers to obtain a 99% reflection.

The mean inhomogeneity of the deposited layers varies between 0.5 and 2% for a single layer.

Finally, it should be noted that the use of certain nonionic surfactants in the colloidal solutions makes it possible to obtain very uniform films. The preferred nonionic surfactants according to the invention are chosen from among alkyl phenoxy polyethoxy ethanols (e.g. those under the registered trademark Triton-X manufactured by Rohm & Hass Corporation) or a polyglycol ether (e.g. that marketed under the trademark Tergitol by Union Carbide Corporation). Preferably, these nonionic surfactants are used at a rate of 10 to 50 mg per liter of colloidal suspension.

The dielectric mirrors produced according to the invention have a particularly good resistance to the laser flux. Thus, the systems $TiO_2$-$SiO_2$, $TiO_2$-$CaF_2$ or $TiO_2$-$MgF_2$ give relatively low laser damage thresholds for the near infrared (2 to 4 $J/cm^2$), the $ZrO_2$-$SiO_2$, $HfO_2$-$SiO_2$, and $Nb_2O_5$-$SiO_2$ systems give moderate values (10 to 15 $J/cm^2$), while the $AlOOH$-$SiO_2$, $ThO_2$-$SiO_2$ and $Ta_2O_5$-$SiO_2$ systems give very high laser resistances (35 to 50 $J/cm^2$). All these laser flux resistance values were measured with pulses of 16 ns and a frequency of 30 Hz. The laser flux resistance performance characteristics of these mirrors according to the invention are comparable with those of conventional mirrors and well above the latter in the case of $AlOOH$-$SiO_2$.

The following examples serve to illustrate the invention.

EXAMPLE 1

A ground glass substrate 2 was replicated (registered trademark BK-7 manufactured by Schott), having a diameter of 200 mm and a thickness of 25 mm, by applying an epoxy resin of the cycloaliphatic glycidyl-ether type using the Assus process. A molded resin surface with a thickness of approximately 60 μm is obtained, with an average smoothness of $\lambda/10$ at a wavelength $\lambda$ of 633 nm and a roughness of 15 Å rms. The mold release or demolding agent was in this case a gold film deposited by vacuum metallization. Thus, a comparison was possible with the use of a chemical demolding agent. The replicated substrate then underwent gentle cleaning with a rag impregnated with isopropyl alcohol filtered to 0.2 μm.

This was allowed by rapid hydrolysis in 750 g of deionized water (41.7 moles) of 91.5 g of titanium tetraisopropoxide (0.32 mole) distilled at 45° C. under a pressure of 0.05 Torr (6.66 Pa). At the end of hydrated oxide precipitation, the isopropanol produced was distilled at 82° C. under a pressure of 760 Torr ($10^5$ Pa) until the said alcohol was exhausted. When the reflux temperature reaches 100° C., addition then takes place of a mixture of 8.8 g of tetramethyl ammonium hydroxide (0.019 mole) or 2.39 g of diethyl amine (0.032 mole) in 55 g of isopropanol. The solution then undergoes UV irradiation (low pressure mercury vapour lamp) and this solution is maintained under total reflux for 8 hours. This gives a bluish, translucent, colloidal solution containing monodisperse rectangular, $TiO_2$ anatase particles with a length between 10 and 20 nm and a width of approximately 5 mm. The sol obtained with a pH close to 12 is concentrated to 25% in oxide (103 g) and then rediluted to 3.5% by a pure methanol addition. The sol obtained is stable for several months and hereinafter is referred to as sol A.

697.5 g of pure ethanol are mixed with 91.15 g of tetraethoxy silane (0.44 mole) distilled at 167° C. under a pressure of 760 Torr ($10^5$ Pa). This is followed by the addition of 24.2 g of ammonium hydroxide (28% $NH_3$, 0.4 mole) and hydrolysis takes place for 48 hours at 25° C. This gives an opalescent sol containing amorphous silica spheres with a diameter of 20 nm and a concentration of 3.3%. This sol has a pH close to 10.5 and it is refluxed in vacuo for 24 hours in order to eliminate the dissolved ammonia and until a pH close to 6 is obtained. This is followed by dilution with ethanol so as to obtain 2% oxide ($SiO_2$). The sol obtained will subsequently be called sol B.

To the cleaned, replicated substrate 2 is firstly applied at a speed of 445 r.p.m., the sol A filtered on a 0.2 μm PTFE membrane, followed by drying for 15 to 20 min at a temperature close to 60° C. under an infrared lamp. This is followed by the deposition of the sol B filtered in the same way as sol A, at a speed of 540 r.p.m. The drying stage is then repeated. In order to produce a multilayer mirror, 15 alternating $SiO_2$ and $TiO_2$ layers are deposited. There is a reflection of 98.8±1% at 1053 nm on a useful diameter of 180 mm. In this mirror, the $TiO_2$ and $SiO_2$ mono-layers respectively have refractive indices of 1.85 and 1.22 at 1053 nm. These layers have a porosity of approximately 50 to 55%.

EXAMPLE 2

A gentle cleaning using isopropanol filtered to 0.2 μm takes place on a substrate identical to that of example 1 and whereof one of the faces has been replicated in the same way as in example 1 and having a final plainness or smoothness of λ/11 at a wavelength λ of 633 nm.

Vigorous hydrolysis takes place of 246 g of sec-aluminium butoxide (1.0 mole) in 3000 g of deionized water (166 mole at 65° C.). This gives a voluminous, whitish precipitate of hydrated alumina. This is followed by extraction by distillation of the isobutanol at 98° C. and a pressure of 760 Torr ($10^5$ Pa) and refluxing then occurs at 100° C. The precipitate is then peptized by adding 7 g of concentrated hydrochloric acid (0.07 mole) and maintaining under total reflux for approximately 15 hours. This gives a finely divided, opalescent, colloidal sol containing particles of alumina boehmite of parallelepipedic morphology (40 nm×20 nm×50 nm). The colloidal medium is monodispersed. This hydrated λ alumina sol is concentrated in vacuo to 5% in $Al_2O_2$ (1020 g). There is then a change from a pH of 3.5 to a final pH of 5.5, without any loss of colloidal stability, using a deacidification process on ion exchange resin (trademark Amberlite IRA-93 SP manufactured by Rohm and Hass). The sol is then further concentrated to 12% $Al_2O_3$ (425 g). This gives a product in the form of: gelatinous paste, which can be easily redispersed under ultrasonics in light aliphatic alcohols. It is then possible to refluidify this sol by dilution at 3.5% $Al_2O_3$ in pure methanol. To the alumina sol obtained is then added a little nonionic surfactant Triton-X 100 (registered trademark), at a rate of 10 mg/l and filtered on a fiber screen. The sol obtained tends to thicken after storing for 2 weeks and is subsequently called sol A.

Synthesis takes place of a silica sol in an identical manner to that of example 1. However, this sol is not refluxed and it therefore remains basic at a pH close to 10.5. This sol is diluted to 1.5% silica in ethanol and then filtered on a PTFE or PVDF (polyvinylidene fluoride) membrane. The sol obtained is called sol B.

On the clean, replicated substrate 2 is deposited by centrifugal spreading a first layer of sol B at a rate of 350 r.p.m. and then a layer of sol A at a rate of 800 r.p.m. Between the deposition of each layer there is a 5 to 10 minute drying stage under an infrared lamp and at a temperature close to 60° C. After depositing 34 alternating layers of $SiO_2$ and $Al_2O_3$, measurement takes place of the reflections at an incidence of 0°, which are 99.0±0.7% at a wavelength of 1053 nm and 98.3±1.0% at a wavelength of 351 nm.

In this completely crack-free dielectric mirror, the $SiO_2$ and $Al_2O_3$ monolayers have respective refractive indices of 1.22 and 1.44 at 1053 nm and respective porosities of 50 and 35%.

EXAMPLE 3

A borosilicate glass substrate of registered trademark Duran 50 (manufactured by Schott) with a diameter of 200 mm and a thickness of 25 mm is replicated by the impression of a silica master substrate with a bisphenol diglycidol-ether-type resin. Use is made of the process described by Mahé and Marioge and whose bibliographical references were given hereinbefore. A molded resin surface is obtained with a thickness of 30 μm, a smoothness of λ/10 at a wavelength λ of 633 nm and a roughness of 10 Å rms. In this procedure, the demolding agent is a silane-based polymer. The replicated substrate 2 obtained is then cleaned with isopropanol filtered at 0.2 μm.

An alumina sol is prepared in the same way as described in example 2, except that the acid sol is concentrated to 15% in $Al_2O_3$, so as to obtain a paste, and is then finely redisbursed by dilution to 2.6% in oxide in pure methanol. This colloidal sol is deacidified to a pH of 3.5 by adding a soluble epoxy compound such as propylene oxide. To obtain an appropriate deacidification, it is necessary for the epoxy/acid molecular ratio to be between 1:2 and 1:1. The sol obtained remains fluid for several months and can be very easily filtered on a fiberglass screen. This sol is subsequently called sol A.

A silica sol is prepared in a similar manner to that described in example 2, except that the final concentration is 1.65%. Filtration can take place on a fiber screen or a PTFE or PVDF membrane.

On the cleaned, replicated substrate 2 is firstly deposited the sol B at a rate of 400 r.p.m. by centrifugal spreading, followed by the sol A at a rate of 600 r.p.m. Following each deposition of sol A, the film is treated for 10 minutes in ammonia vapors. Following each deposition of sol B, said layer is left in the open air for 10 min. This procedure is repeated several times until a mirror is obtained which has in all 36 layers, i.e. 18 layers of $SiO_2$ alternating with 18 layers of $Al_2O_3$. This mirror has a trichroic spectral response. The reflections measured at an incidence of 0° are 99.2±1.0% at a wavelength of 1053 nm, 90.0±1.5% at a wavelength of 530 nm and 85.0±1.5% at 351 nm.

This crack-free trichroic film has no significant inhomogeneity and is formed from $SiO_2$ and $Al_2O_3$ monolayers with characteristics identical to those of example 2.

EXAMPLE 4

Sols A and B are produced in an identical manner to what was described in example 3. This is followed by the application of sol B by centrifugal spreading at a speed of 330 r.p.m. and then sol A at 510 r.p.m. 24 layers in all of $SiO_2$ and $Al_2O_3$ are produced. The mirror obtained operates at an incidence of 37° and gives as reflection in perpendicular polarization "s" 98.1±1.0% at a wavelength of 1053 nm, 88.3±2.0% at 527 nm and 87.4±2.5% at 351 nm.

The mirror obtained is uniform and free from cracks. At an incidence of 0°, said component loses roughly 15% in reflection at the three above wavelengths.

In the 4 examples given hereinbefore, the average smoothness of the substrates before the sol-gel treatment was λ/10 at a wavelength λ of 633 nm. The treatment leads to a slight deterioration of the surface state and the average smoothness of the mirror obtained varies between λ/7 and λ/8 at 633 nm.

We claim:

1. An interferential dielectric mirror comprising a planar, ground substrate (2), whose surface has been replicated with a thermal plastic resin (4), said resin being chosen from the group consisting of epoxy, bisphenol diglycidyl-ether, glycidyl-ester, glycidyl-amide, glycidyl-amine, silicone-glycidyl, thioglycidyl and fluoroglycidyl resins, said substrate being covered with at least one first layer (6) of colloids and at least one second layer (8) of colloids, the first layer (6) having a refractive index below that of the second layer (8)

and said two types of layers (6, 8) being arranged on the substrate in an alternating manner.

2. The dielectric mirror according to claim 1, wherein the colloids of the first layer (6) are chosen from the group consisting of silicon oxide, calcium fluoride and magnesium fluoride.

3. The dielectric mirror according to claim 1, wherein the colloids of the second layer (8) are chosen from the group consists of oxides of titanium, aluminum, zirconium, hafnium, thorium, tantalum, niobium, yttrium, scandium and lanthanum.

4. The dielectric mirror according to claim 1, wherein the colloids of the first layer (6) are constituted by silicon oxide and the colloids of the second layer (8) by alumina.

5. An interferential dielectric mirror comprising a planar, ground substrate (2), whose surface has been replicated with a thermoplastic resin (4), said substrate being covered with at least one first layer (6) of colloids and at least one second layer (8) of colloids, the colloids of said layers (6, 8) having a diameter between approximately 5 and 40 nm, the first layer (6) having a refractive index below that of the second layer (8) and said two types of layers (6, 8) being arranged on the substrate in an alternating manner.

6. An interferential dielectric mirror comprising a planar, ground substrate (2), whose surface has been replicated with a thermoplastic resin (4), said substrate being covered with at least one first layer (6) of colloids and at least one second layer (8) of colloids, the thickness of said layers (6, 8) being between 50 and 250 nm, the first layer (6) having a refractive index below that of the second layer (8) and said two types of layers (6, 8) being arranged on the substrate in an alternating manner.

7. An interferential dielectric mirror comprising a planar, ground substrate (2), whose surface has been replicated with a thermoplastic resin (4), the thickness of the thermoplastic resin (4) being between approximately 20 and 100 μm, said substrate being covered with at least one first layer (6) of colloids and at least one second layer (8) of colloids, the first layer (6) having a refractive index below that of the second layer (8) and said two types of layers (6,8) being arranged on the substrate in an alternating manner.

8. An interferential dielectric mirror comprising a planar, ground substrate (2) whose surface has been replicated with a thermoplastic resin (4), said substrate being covered with at least one first layer (6) of colloids and at l one second layer (8) of colloids, the first layer (6) having a refractive index below that of the second layer (8), said two types of layers (6, 8) being arranged on the substrate in an alternating manner and at least one of the two layers (6, 8) incorporating a nonionic surfactant.

9. The dielectric mirror according to claim 8, wherein the nonionic surfactant is chosen from the group consisting of alkyl phenoxy polyethoxy ethanol and polyglycol ethers.

10. The dielectric mirror according to claim 8, wherein the surfactant concentration is between 10 and 50 mg/liter of suspension of colloids used for producing said layers (6–8).

11. A process for the production of an interferential dielectric mirror of the type including a planar ground substrate (2) whose surface has been replicated with a thermoplastic resin (4), the substrate being covered with at least one first layer (6) of colloids and at least one second layer (8) of colloids, the first layer (6) having a refractive index below that of the second layer (8) and the two types of layers (6, 8) being arranged on the substrate in an alternating manner, said process comprising the steps of coating a master substrate (10) with a demolding agent (12), trapping between the master substrate (10) and a planar, ground substrate (2) the thermoplastic resin (4), said thermoplastic resin being chosen from the group consisting of epoxy, bisphenol diglycidyl-ether, glycidyl-ester, glycidyl-amide, glycidyl-amine, silicone-glycidyl, thioglycidyl and fluoroglycidyl resins, polymerizing and cross linking the said resin (4), separating the master substrate (10) from the replicated substrate (2), preparing a first colloidal suspension of colloids (6), preparing a second colloidal suspension of colloids (8) having a refractive index higher than that of the first suspension (6), depositing on the replicated substrate (2), at ambient temperature, alternate layers (6, 8) of the colloidal suspensions, and drying each layer (6, 8) following its deposition.

12. The process for the production of an interferential dielectric mirror according to claim 11, wherein the first colloidal suspension (6) incorporates colloids chosen from among the group consisting of silicon oxide, calcium fluoride and magnesium fluoride and dispersed in a solvent.

13. The process for the production of an interferential dielectric mirror according to claim 11, wherein the second colloidal suspension (8) incorporates colloids chosen from the group consisting of the oxides of aluminum, titanium, zirconium, hafnium, thorium, tantalum, niobium, yttrium, scandium and lanthanum and dispersed in a solvent.

14. The process for the production of an interferential dielectric mirror according to claim 12 or 13, wherein the solvent is chosen from the group consisting of saturated aliphatic alcohols of formula ROH, in which R stands for an alkyl with 1 to 4 carbon atoms.

15. The process for the production of an interferential dielectric mirror according to claim 11, wherein the deposition of the layers of colloids (6, 8) takes place by centrifugal coating.

16. The process for the production of an interferential dielectric mirror according to claim 11, wherein the demolding agent (12) is chosen from the group consisting of silicones, fluorinated polymers and sucroses.

17. The process for the production of an interferential dielectric mirror according to claim 11, wherein drying takes place at a temperature of approximately 60° C.

* * * * *

UNITED STATES PATENT AND TRADEMARK OFFICE
CERTIFICATE OF CORRECTION

PATENT NO. : 5,623,375
DATED : April 22, 1997
INVENTOR(S) : Herve Floch and Michel Berger It is certified that error appears in the above-identified patent and that said Letters Patent is hereby corrected as shown below:

On the title page, item, [54] and column 1:

INTERFERENTIAL DIELECTRIC MIRROR AND PRODUCTION PROCESS
    FOR SUCH A MIRROR

Signed and Sealed this

Ninth Day of September, 1997

Attest:

BRUCE LEHMAN

Attesting Officer     *Commissioner of Patents and Trademarks*